United States Patent
Spuhler et al.

(10) Patent No.: US 10,527,171 B2
(45) Date of Patent: Jan. 7, 2020

(54) GASKET

(71) Applicant: Cellular Research, Inc., Menlo Park, CA (US)

(72) Inventors: Philipp S. Spuhler, Redwood City, CA (US); Geoffrey R. Facer, Redwood City, CA (US); Sixing Li, Mountain View, CA (US); Christopher G. Cesar, Menlo Park, CA (US)

(73) Assignee: Cellular Research, Inc., Menlo Park, CA (US)

( * ) Notice: Subject to any disclaimer, the term of this patent is extended or adjusted under 35 U.S.C. 154(b) by 147 days.

(21) Appl. No.: 15/677,849

(22) Filed: Aug. 15, 2017

(65) Prior Publication Data
US 2019/0056028 A1  Feb. 21, 2019

(51) Int. Cl.
*F16J 15/02* (2006.01)
*B01L 3/00* (2006.01)
*F16J 15/14* (2006.01)
*B01L 1/00* (2006.01)

(52) U.S. Cl.
CPC ............. *F16J 15/022* (2013.01); *B01L 3/563* (2013.01); *B01L 3/565* (2013.01); *F16J 15/14* (2013.01); *B01L 2200/023* (2013.01); *B01L 2200/026* (2013.01); *B01L 2200/0689* (2013.01); *B01L 2300/0803* (2013.01); *B01L 2300/0858* (2013.01); *B01L 2300/123* (2013.01)

(58) Field of Classification Search
CPC  F16J 15/022; F16J 15/021; F16J 15/02; F16J 15/00; B01L 1/00; B01L 3/502761; B01L 3/5027; B01L 3/502; B01L 3/50
USPC ............................ 422/502, 500, 50; 277/345
See application file for complete search history.

(56) References Cited

U.S. PATENT DOCUMENTS

| | | | |
|---|---|---|---|
| 5,888,826 A * | 3/1999 | Ostgaard ................ | B01L 3/502 422/504 |
| 2004/0217082 A1* | 11/2004 | Claessens ................ | A61J 1/18 215/249 |
| 2013/0261591 A1* | 10/2013 | Denning ............... | A61J 1/1406 604/403 |
| 2016/0310940 A1* | 10/2016 | Rajagopal ............. | B01L 3/5021 |
| 2016/0310941 A1* | 10/2016 | Rajagopal ............. | B01L 3/5021 |
| 2017/0014826 A1* | 1/2017 | Engel ...................... | B01L 3/523 |
| 2017/0203046 A1* | 7/2017 | LaRose ................. | A61L 31/048 |
| 2018/0200710 A1 | 7/2018 | Spuhler | |

* cited by examiner

*Primary Examiner* — Christine T Mui
(74) *Attorney, Agent, or Firm* — Kathleen Y. Rao; Bret E. Field; Bozicevic, Field & Francis LLP

(57) ABSTRACT

Disclosed herein are methods, devices, and systems for fluidic handling. In some embodiments, a gasket for providing a fluidic interface with a flowcell includes an inner cavity extending distally from a proximal end of the gasket, the inner cavity being defined by a plurality of inner surfaces sections, an inlet port positioned at a distal end of the inner cavity, an outlet port positioned at a distal end of the gasket, and a cannula extending between the inlet port and the outlet port; wherein at least some of the plurality of inner surface sections are tapered towards the distal end of the gasket to direct a pipette tip received within the gasket towards the inlet port of the gasket.

28 Claims, 11 Drawing Sheets

GASKET

BACKGROUND

Field

The present disclosure relates generally to the field of sample loading, and more particularly, relates to gaskets for fluidic interfacing.

Description of the Related Art

Methods and techniques such as stochastic barcoding are useful for single cell analysis, in particular deciphering gene expression profiles to determine the states of single cells using, for example, reverse transcription, polymerase chain reaction (PCR) amplification, and next generation sequencing (NGS). There is a need for methods and techniques for efficient sample loading, such as samples comprising barcode-bearing magnetic beads and/or cells onto a flowcell having one or more microwell arrays situated therein.

SUMMARY

In some embodiments, a gasket for providing a fluidic interface with a flowcell is disclosed. The gasket includes a proximal end, a distal end configured to be received within the flowcell, an inner cavity extending distally from the proximal end, the inner cavity being defined by a plurality of inner surface sections, an inlet port positioned at a distal end of the inner cavity, an outlet port positioned at the distal end of the gasket, and a cannula extending between the inlet port and the outlet port, wherein at least some of the plurality of inner surface sections are tapered towards the distal end of the gasket to direct a pipette tip received within the gasket towards the inlet port of the gasket.

In some embodiments, at least some of the plurality of inner surface sections are frustoconical in shape. In some embodiments, the plurality of inner surface sections include a first set of inner surface sections configured to receive a pipette tip of a first size and a second set of inner surface sections configured to receive a pipette tip of a second size. In some embodiments, a largest diameter of each inner surface section of the second set of inner surface sections is less than a smallest diameter of each inner surface section of the first set of inner surface sections. In some embodiments, the inner surface sections of the second set of inner surface sections are positioned distally from the inner surface sections of the first set of inner surface sections. In some embodiments, at least one of the plurality of inner surface sections includes a plurality of vents. In some embodiments, at least some of the plurality of vents are recessed from a plurality of intermittent surface portions extending between the plurality of vents. In some embodiments, the gasket includes a first body section having a first body section outer diameter and a second body section positioned distal to the first body section and having a second body section outer diameter, wherein the second body section outer diameter is less than the first body section outer diameter. In some embodiments, the gasket includes a third body section positioned distal to the second body section and having a third body section outer diameter, wherein the third body section outer diameter is greater than the second body section outer diameter, and wherein the third body section outer diameter is less than the first body section outer diameter. In some embodiments, the gasket includes a sealing ring extending distally from a distal end of the first body section. In some embodiments, the gasket is formed of a thermoplastic material. In some embodiments, the gasket is formed of an elastomeric material. In some embodiments, the gasket is integrally formed.

In some embodiments, the gasket is included in a flowcell. In some embodiments, the flowcell includes a fluidic layer having a first gasket interface and an interface layer having a second gasket interface. In some embodiments, the gasket is compressed between the first gasket interface and the second gasket interface. In some embodiments, a distal section of the gasket is positioned within a lumen of the first gasket interface. In some embodiments, the lumen of the first gasket interface flares distally. In some embodiments, the lumen of the first gasket interface extends between an inlet port of the lumen of the first gasket interface and an outlet port of the lumen of the first gasket interface, wherein at least a portion of the distal section of the gasket positioned within the lumen of the first gasket interface has a diameter greater than a diameter of the inlet port. In some embodiments, the second gasket interface includes a lumen for receiving a pipette tip, wherein the lumen is at least partially defined by an inner surface of a wall of the second gasket interface, wherein a distal edge of the wall of the second gasket interface is positioned to compress a proximal portion of the gasket. In some embodiments, the gasket includes a first body section and a sealing ring extending distally from end of the first body section. In some embodiments, the second gasket interface includes a recess having a bottom surface, wherein the bottom surface is positioned to engage the sealing ring. In some embodiments, the second gasket interface includes a wall, wherein a distal edge of the wall of the second gasket interface is positioned to compress a proximal portion of the gasket such that the gasket bends about the sealing ring. In some embodiments, the first gasket interface, second gasket interface, and gasket form an inlet port of the flowcell. In some embodiments, the flowcell includes an outlet port. In some embodiments, the flowcell includes a microwell array.

In some embodiments, a method for positioning the gasket within a flowcell is disclosed. The method includes positioning the gasket within a first gasket interface of a fluidic layer of the flowcell, aligning a second gasket interface of an interface layer of the flowcell with the gasket so that the gasket is positioned between the first gasket interface and the second gasket interface, and applying a force to the first gasket interface in a direction of the gasket to form a seal between the gasket and the flowcell.

In some embodiments, a method for loading a sample within a flowcell housing the gasket is disclosed. The method includes inserting a pipette tip into the inner cavity of the gasket, aligning the pipette tip with at least one of the plurality of inner surface sections, and applying a force on the pipette tip to form a releasable seal with the gasket. In some embodiments, the method includes introducing a fluid from the pipette into the inlet port of the gasket while maintaining the releasable seal.

BRIEF DESCRIPTION OF THE DRAWINGS

The features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will now be described with additional specificity and detail through use of the accompanying drawings.

DETAILED DESCRIPTION

The following detailed description is directed to certain specific embodiments. The invention(s) disclosed herein, however, can be embodied in a multitude of different ways as defined and covered by the claims. In this description, reference is made to the drawings, wherein like parts are designated with like numerals throughout. The features, aspects and advantages of the present invention will now be described with reference to the drawings of several embodiments that are intended to be within the scope of the development herein disclosed. These and other embodiments will become readily apparent to those skilled in the art from the following detailed description of the embodiments having reference to the attached figures, the invention not being limited to any particular embodiment(s) herein disclosed.

All patents, published patent applications, and other publications referred to herein are incorporated by reference in their entirety with respect to the related technology.

FIGS. 1-6 illustrate a non-limiting embodiment of a gasket 100. The gasket 100 can include one or more structures or features designed to provide a fluidic interface for the delivery of a fluid into a flowcell. In some embodiments, the gasket 100 can be configured to provide a fluidic interface between a pipette and a flowcell.

Figure 1:
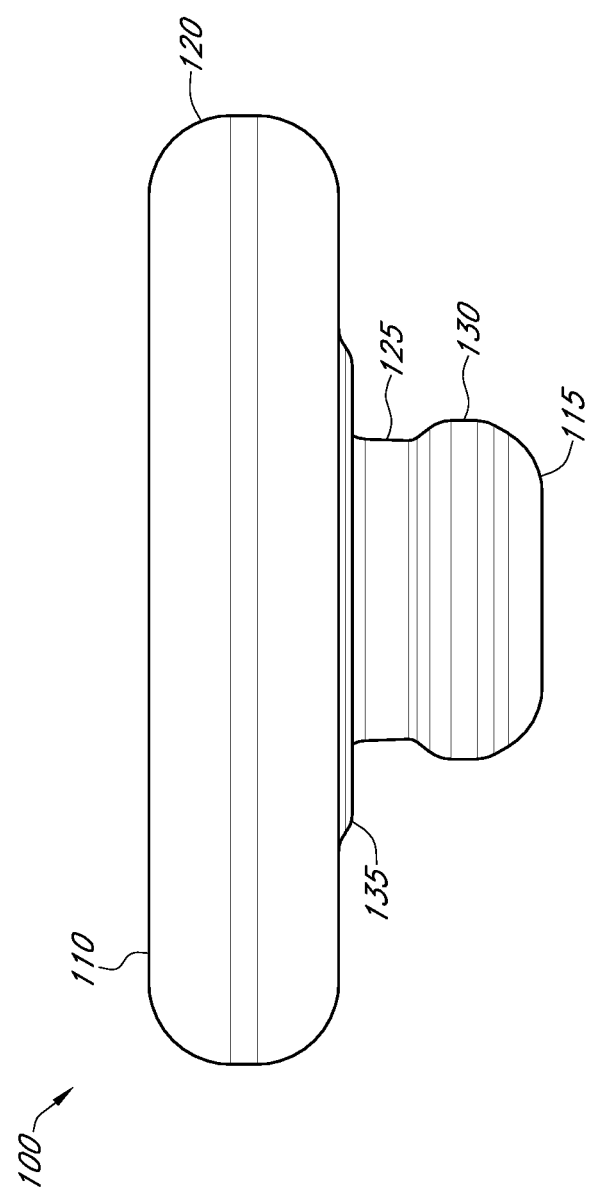
FIG. 1 is a side view of a gasket according to an exemplary preferred embodiment.

FIG. 1 shows a side view of the gasket 100. The gasket 100 can include one or more openings and/or lumens for facilitating the passage of a fluid through at least a portion of the gasket 100. The gasket 100 includes a proximal end 110 and a distal end 115. In some embodiments, the gasket 100 includes one or more openings and/or lumens for facilitating the passage of a fluid between the proximal end 110 and the distal end 115.

In some embodiments, the gasket 100 can include a first body section 120. The first body section 120 can be ring-shaped or generally cylindrical. In some embodiments, a proximal edge of the first body section 120 can define the proximal end 110 of the gasket 100. In some embodiments, the first body section 120 extends distally from the proximal end 110.

In some embodiments, the gasket 100 can include a second body section 125. The second body section 125 can be coupled to or integral with the first body section 120. In some embodiments, the second body section can be ring-shaped or generally cylindrical. In some embodiments, second body section 125 can extend distally from the first body section 120. In some embodiments, an outer diameter of the second body section 125 or a circumference of the second body section 125 can be less than an outer diameter of the first body section 120 or a circumference of the first body section 120.

In some embodiments, the gasket 100 can include a third body section 130. The second body section 130 can be coupled to or integral with the second body section 125. In some embodiments, the third body section 130 can be ring-shaped or generally cylindrical. In some embodiments, the third body section 130 can extend distally from the second body section 125. In some embodiments, an outer diameter of the third body section 130 or a circumference of the third body section 130 can be less than an outer diameter of the first body section 120 or a circumference of the first body section 120. In some embodiments, an outer diameter of the third body section 130 or a circumference of the third body section 130 can be greater than an outer diameter of the second body section 125 or a circumference of the second body section 125. In some embodiments, a distal edge of the third body section 130 can define the distal end 115 of the body.

In some embodiments, gasket 100 can include a sealing ring 135. In use, the sealing ring 135 can form a seal between the gasket 100 and a flowcell. In some embodiments, the sealing ring 135 can be integral with or coupled to the first body section 120. In some embodiments, the sealing ring 135 can protrude distally from the first body section 120. In some embodiments, the sealing ring 135 can be flexible. In some embodiments, the sealing ring 135 can be configured to flex or bend in a distal direction towards a flowcell. In some embodiments, the sealing ring 135 can compensate for differences in the molding of the gasket 100 and a shape of the section of the flowcell receiving the sealing ring 135.

Figure 2:
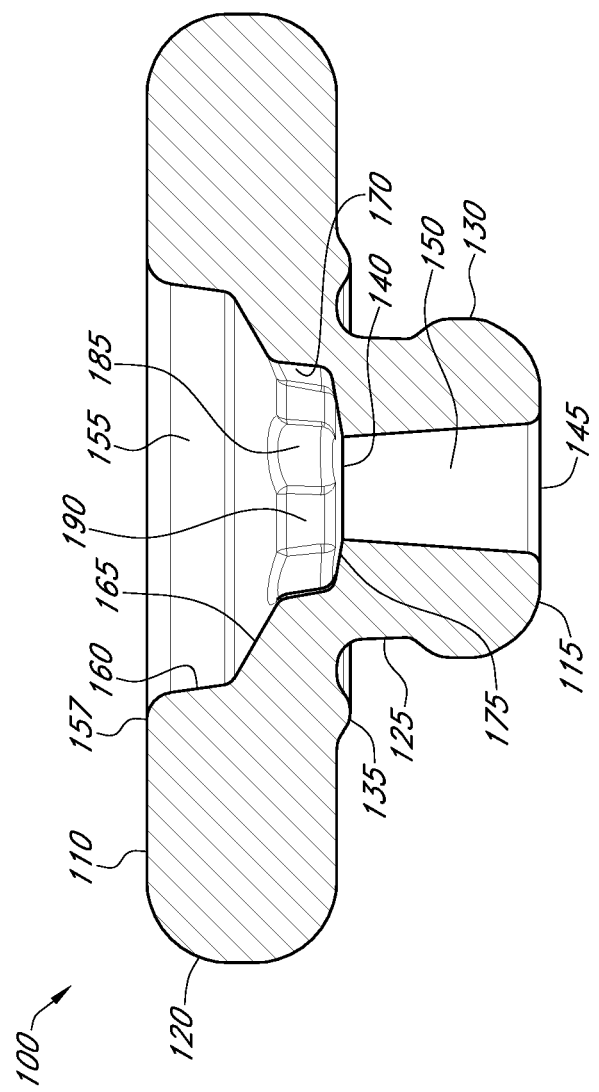
FIG. 2 is a cross-sectional view of the gasket of FIG. 1.

FIG. 2 shows a cross-sectional view of the gasket 100. As shown in FIG. 2, the gasket can include an inlet port 140, an outlet port 145, and a cannula 150 extending therebetween. Fluid received through the inlet port 140 can flow through the cannula 150 and out of the outlet port 145. In use, the inlet port 140 can be aligned with an outlet port of a tip of a pipette to receive fluid.

In some embodiments, the cannula 150 extends through at least a portion of the second body section 125. In some embodiments, the cannula 150 extends through at least a portion of the third body section 130. In some embodiments, the cannula 150 extends from a proximal end of the second body section 125 to a distal end of the third body section 130. In some embodiments, the inlet port 140 is positioned at proximal end of the second body section 125. In some embodiments, the outlet port 145 is positioned at a distal end of the third body section 130.

In some embodiments, the gasket 100 can include an inner cavity 155. The inner cavity 155 can be configured to receive a tip of a pipette. In some embodiments, the gasket 100 can include an opening 157 at the proximal end 110 of the gasket 100. In some embodiments, the inner cavity 155 can extend between the opening 157 and the inlet port 140. In some embodiments, the inner cavity 155 can be defined by one or more alignment features configured to align an outlet port of a tip of a pipette with the inlet port 140 of the gasket. In some embodiments, the inlet port 140 can open to a distal end of the inner cavity 155. In some embodiments, at least a portion of the inlet port 140 is positioned below a geometric center of the distal end of the inner cavity 100. In some embodiments, at least a portion of the inlet port 140 can be positioned along a longitudinal axis extending from a proximal end of the inner cavity 155 to the distal end of the inner cavity 155. In some embodiments, the inner cavity 155 can include one or more alignment features configured to align the outlet ports of the tips of a plurality of different sizes of pipettes with the inlet port 140 of the gasket. In some embodiments, alignment features can include one or more inner surface sections of the gasket 100 that define the inner cavity 155.

In some embodiments, the inner cavity 155 can be defined at least partially by an inner surface section 160. The inner surface section 160 can be frustoconical or generally frustoconical in shape. In some embodiments, the inner surface section 160 can angle or taper from a proximal end of the inner surface section 160 to a distal end of the inner surface section 160. In some embodiments, the inner surface section 160 tapers at an angle of 10°, 20°, 30°, 40°, or 50° from normal. In some embodiments, the inner surface section 160 tapers at an angle of less 10°, less than 20°, less than 30°, less than 40°, or less than 50° from normal. In some embodiments, the inner surface section 160 tapers at an angle of between 5° to 10°, between 10° to 20°, between 20° to 30°, or between 30° to 40° from normal. In some embodiments, the inner surface section 160 tapers at an angle of 5°, 6°, 7°, 8°, 9°, 10°, or 11° from normal. In some embodiments, inner surface section 160 can be shaped so that the inner cavity 155 narrows from the proximal end of the inner surface section 160 to the distal end of the inner surface section 160. In some embodiments, a diameter or circumference of the proximal end of the inner surface section 160 can be greater than a diameter or circumference at a distal end of the inner surface section 160.

In some embodiments, the inner surface section 160 can act as an alignment feature for aligning an outlet port of a pipette with the inlet port 140 of the gasket 100. In some embodiments, the taper of the inner surface section 160 can bias a tip of a pipette towards the center of the inner cavity 155. In some embodiments, the taper of the inner surface section 160 can bias a tip of a pipette towards the inlet port 140.

In some embodiments, the inner cavity 155 can be defined at least partially by an inner surface section 165. In some embodiments, the inner surface section 165 can be positioned distally with respect to the inner surface section 160. In some embodiments, a diameter of a proximal end of the inner surface section 165 can be less than a diameter of the distal end of the inner surface section 160. The inner surface section 165 can be frustoconical or generally frustoconical in shape. In some embodiments, the inner surface section 165 can angle or taper from a proximal end of the inner surface section 165 to a distal end of the inner surface section 165. In some embodiments, the inner surface section 165 tapers at an angle of 30°, 35°, 40°, 45°, 50°, 55°, 60°, 65°, 70°, 75°, or 80° from normal. In some embodiments, the inner surface section 165 tapers at an angel of greater than 30°, greater than 35°, greater than 40°, greater than 45°, greater than 50°, greater than 55°, or greater than 60° from normal. In some embodiments, the inner surface section 165 tapers at an angle of between 30° to 60°, between 40° to 50°, between 45° to 75°, between 50° to 70°, or between 55° to 65° from normal. In some embodiments, the inner surface section 165 tapers at an angle of 56°, 57°, 58°, 59°, 60°, 61°, 62°, 63°, or 64° from normal. In some embodiments, inner surface section 165 can be shaped so that the inner cavity 155 narrows from the proximal end of the inner surface section 165 to the distal end of the inner surface section 165. In some embodiments, a diameter or circumference of the proximal end of the inner surface section 165 can be greater than a diameter or circumference at a distal end of the inner surface section 165.

In some embodiments, the inner surface section 165 can act as an alignment feature for aligning an outlet port of a pipette with the inlet port 140 of the gasket 100. In some embodiments, the taper of the inner surface section 165 can bias a tip of a pipette towards the center of the inner cavity 155. In some embodiments, the taper of the inner surface section 165 can bias a tip of a pipette towards the inlet port 140.

In some embodiments, the inner surface section 165 can act as an interface surface for contacting a distal end of a tip of a pipette. For example, some pipette tips may have a diameter at a distal end greater than the diameter of the distal end of the inner surface section 165. In some embodiments, the inner surface section 165 can form a seal with a distal end of a pipette tip so as to prevent the flow of fluid into portions of the gasket 100 radially beyond the distal end of the pipette tip. In some embodiments, the angle of the inner surface section 165 can prevent formation of a friction fit between the gasket 100 and a tip of a pipette when the distal end of the tip of the pipette interfaces with the inner surface section 165.

In some embodiments, the inner cavity 155 can be defined at least partially by an inner surface section 170. In some embodiments, the inner surface section 170 can be positioned distally with respect to the inner surface section 165. In some embodiments, a diameter of a proximal end of the inner surface section 170 can be less than a diameter of the distal end of the inner surface section 165. The inner surface section 170 can be frustoconical or generally frustoconical in shape. In some embodiments, the inner surface section 170 can angle or taper from a proximal end of the inner surface section 170 to a distal end of the inner surface section 170. In some embodiments, inner surface section 170 can be shaped so that the inner cavity 155 narrows from the proximal end of the inner surface section 170 to the distal end of the inner surface section 170. In some embodiments, a diameter or circumference of the proximal end of the inner surface section 170 can be greater than a diameter or circumference at a distal end of the inner surface section 170.

In some embodiments, the inner surface section 170 can act as an alignment feature for aligning an outlet port of a pipette with the inlet port 140 of the gasket 100. In some embodiments, the taper of the inner surface section 170 can bias a tip of a pipette towards the center of the inner cavity 155. In some embodiments, the taper of the inner surface section 170 can bias a tip of a pipette towards the inlet port 140.

In some embodiments, the inner surface section 170 can include a plurality of vents 185 and a plurality of surface portions 190. In some embodiments, the plurality of surface portions 190 can be a plurality of intermittent portions extending between the vents 185. The vents 185 can be recessed laterally from the plurality of surface portions 190. In some embodiments, one or both of the vents 185 and the surface portions 190 can angle or taper from the proximal end of the inner surface section 170 to the distal end of the inner surface section 170.

In some embodiments, one or both of the vents 185 and the surface portions 190 can act as alignment features for aligning an outlet port of a pipette with the inlet port 140 of the gasket 100. In some embodiments, the taper of one or both of the vents 185 and the surface portions 190 can bias a tip of a pipette towards the center of the inner cavity 155.

In some embodiments, the taper of one or both of the vents 185 and the surface portions 190 can bias a tip of a pipette towards the inlet port 140.

In some embodiments, if a tip of a pipette extends into the section of the inner cavity defined by the inner surface 170, the vents 185 and surface portions 190 can act in combination to provide different gap distances between the inner surface 170 and the tip of the pipette. For example, in some embodiments, the gap distance between the inner surface 170 and the pipette tip within the vents 185 can be greater than the gap distance between the inner surface 170 and the pipette tip at the surface portions 190.

In some embodiments, smaller gap distances between the inner surface 170 and a pipette tip at the surface portions 190 can enhance alignment of the pipette tip. However, in some embodiments, smaller gap sizes between the inner surface 170 and a pipette tip can increase the likelihood of formation of a friction fit between the inner surface 170 and the pipette tip. In some embodiments in which the gap distance between the inner surface 170 and the pipette tip within the vents 185 is greater than the gap distance between the inner surface 170 and the pipette tip at the surface portions 190, the greater gap distance between the inner surface 170 and the pipette tip within the vents 185 can be sized to prevent formation of a friction lock. In such embodiments, smaller gap distances between the inner surface 170 and pipette tip at the surface portions 190 are possible. In some embodiments, an inner layer 170 including the vents 185 and surface portions 190 can provide for a greater maximum gap length and/or a greater minimum gap length between the inner layer 170 and the pipette tip than an inner layer 170 having a continuous frustoconical shape.

In some embodiments, the inner cavity 155 can be defined at least partially by an inner surface section 175. In some embodiments, the inner surface section 175 can be positioned distally with respect to the inner surface section 170. In some embodiments, a diameter of a proximal end of the inner surface section 175 can be less than a diameter of the distal end of the inner surface section 170. The inner surface section 175 can be frustoconical or generally frustoconical in shape. In some embodiments, the inner surface section 175 can angle or taper from a proximal end of the inner surface section 175 to a distal end of the inner surface section 175. In some embodiments, the inner surface section 175 tapers at an angle of 65°, 70°, 75°, 76°, 77°, 78°, 79°, 80°, 81°, 82°, 83°, 84° or 85° from normal. In some embodiments, the inner surface section 175 tapers at an angle of greater than 75°, greater than 80°, or greater than 85° from normal. In some embodiments, the inner surface section 175 tapers at an angle of between 65° to 90°, between 70° to 90°, or between 75° to 85°. In some embodiments, inner surface section 175 can be shaped so that the inner cavity 155 narrows from the proximal end of the inner surface section 175 to the distal end of the inner surface section 175. In some embodiments, a diameter or circumference of the proximal end of the inner surface section 175 can be greater than a diameter or circumference at a distal end of the inner surface section 175.

In some embodiments, the inner surface section 175 can act as an alignment feature for aligning an outlet port of a pipette with the inlet port 140 of the gasket 100. In some embodiments, the taper of the inner surface section 175 can bias a tip of a pipette towards the center of the inner cavity 155. In some embodiments, the taper of the inner surface section 175 can bias a tip of a pipette towards the inlet port 140. In some embodiments, the distal end of the inner surface section 175 can define an interface between the inner cavity 155 and the fluid inlet port 140.

In some embodiments, the inner surface section 175 can act as an interface surface for contacting a distal end of a tip of a pipette. For example, some pipette tips may have a diameter at a distal end greater than the diameter of the distal end of the inner surface section 175. In some embodiments, the inner surface section 175 can form a seal with a distal end of a pipette tip so as to prevent the flow of fluid into portions of the gasket 100 radially beyond the distal end of the pipette tip. In some embodiments, the angle of the inner surface section 175 can prevent formation of a friction fit between the gasket 100 and a tip of a pipette when the distal end of the tip of the pipette interfaces with the inner surface section 175.

Figure 3:
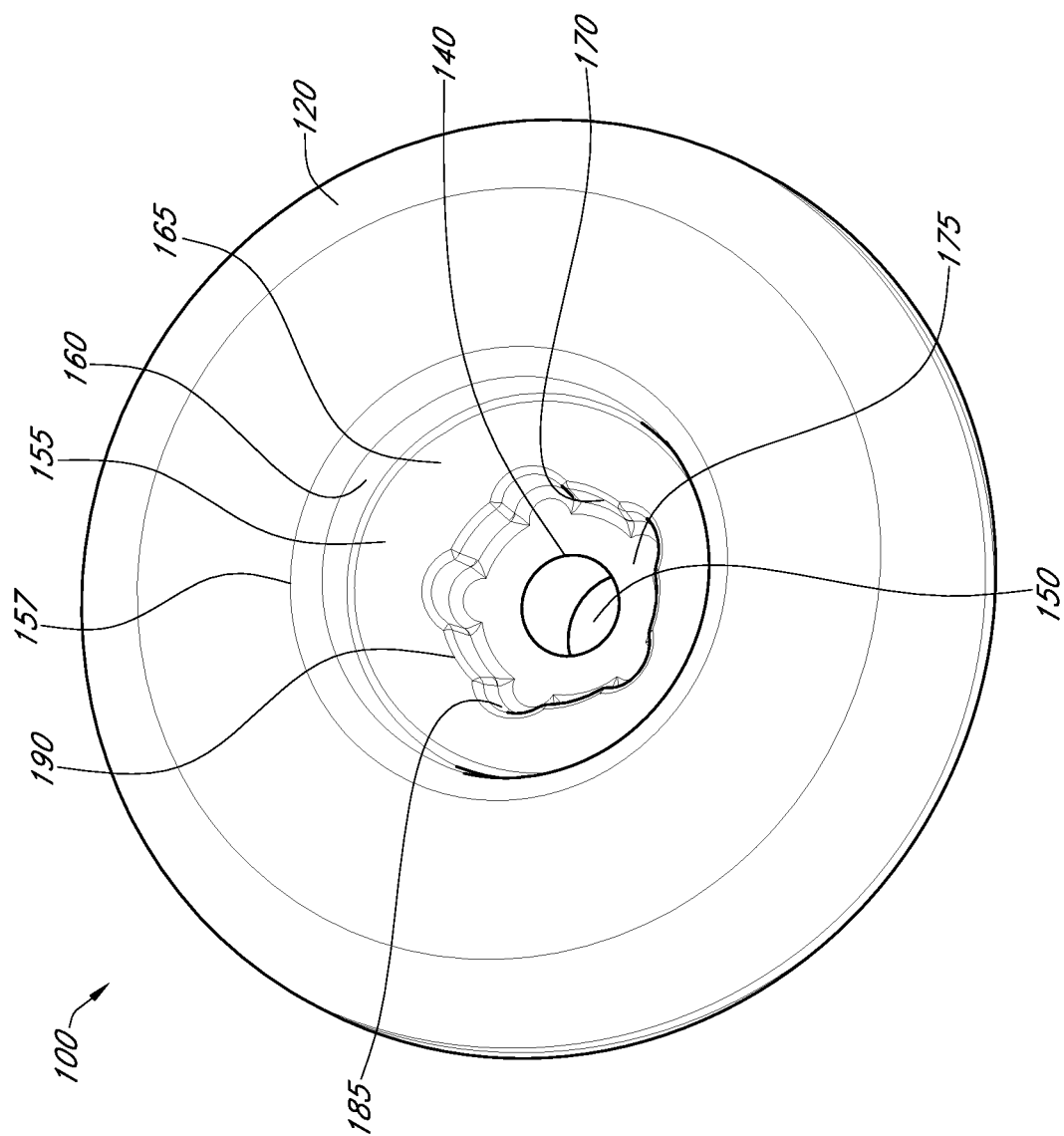
FIG. 3 is a top perspective view of a section of the gasket of FIG. 1.
Figure 4:
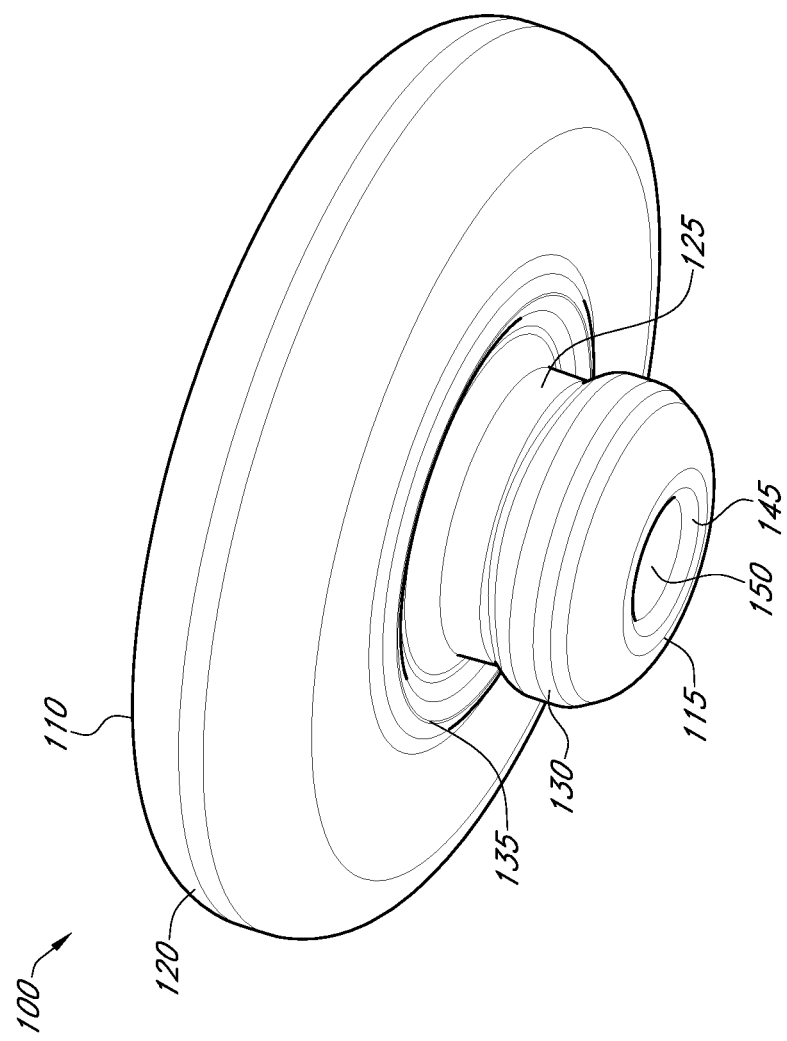
FIG. 4 is a bottom perspective view of the gasket of FIG. 1.
Figure 5:
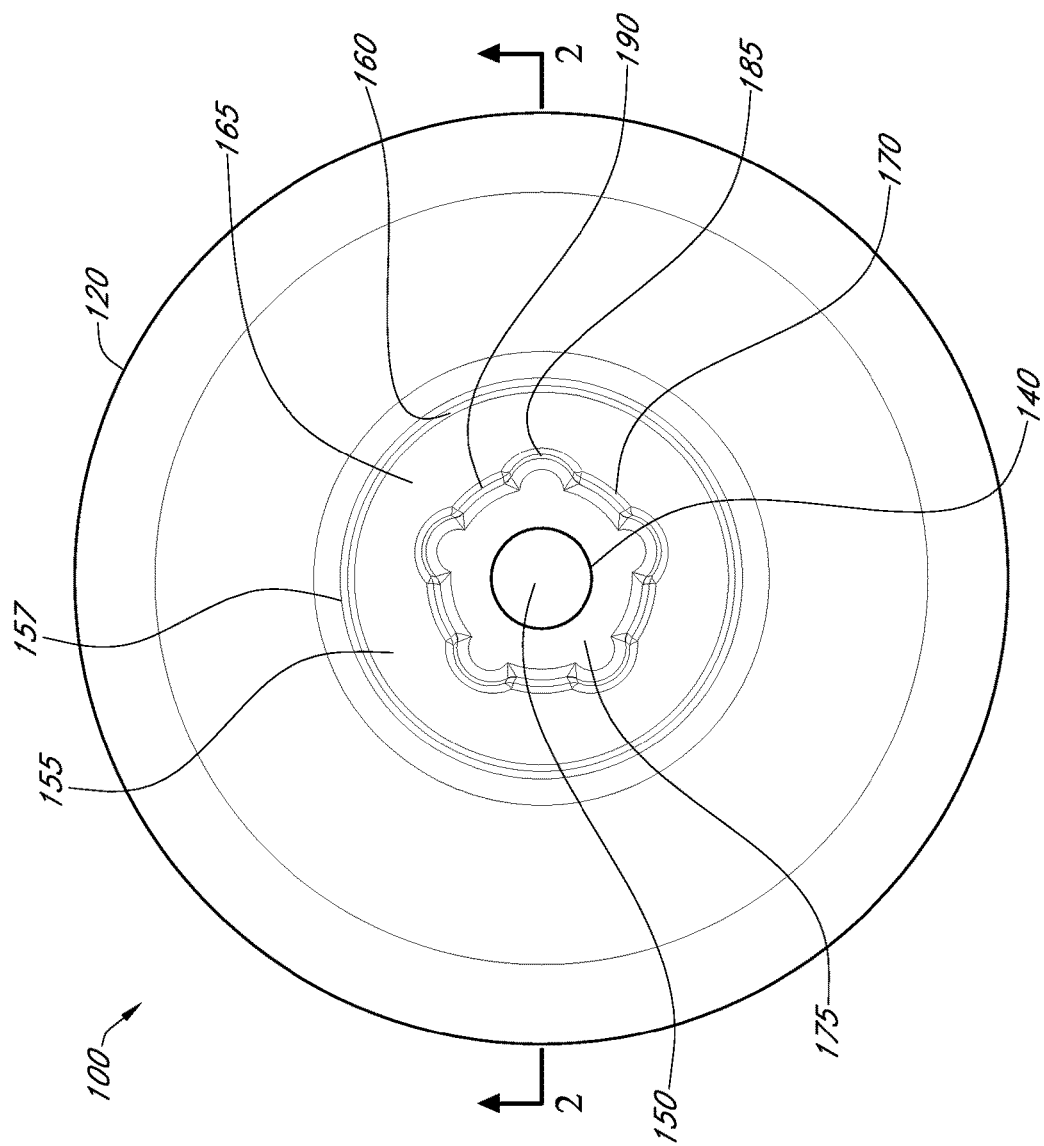
FIG. 5 is a top view of the gasket of FIG. 1.
Figure 6:
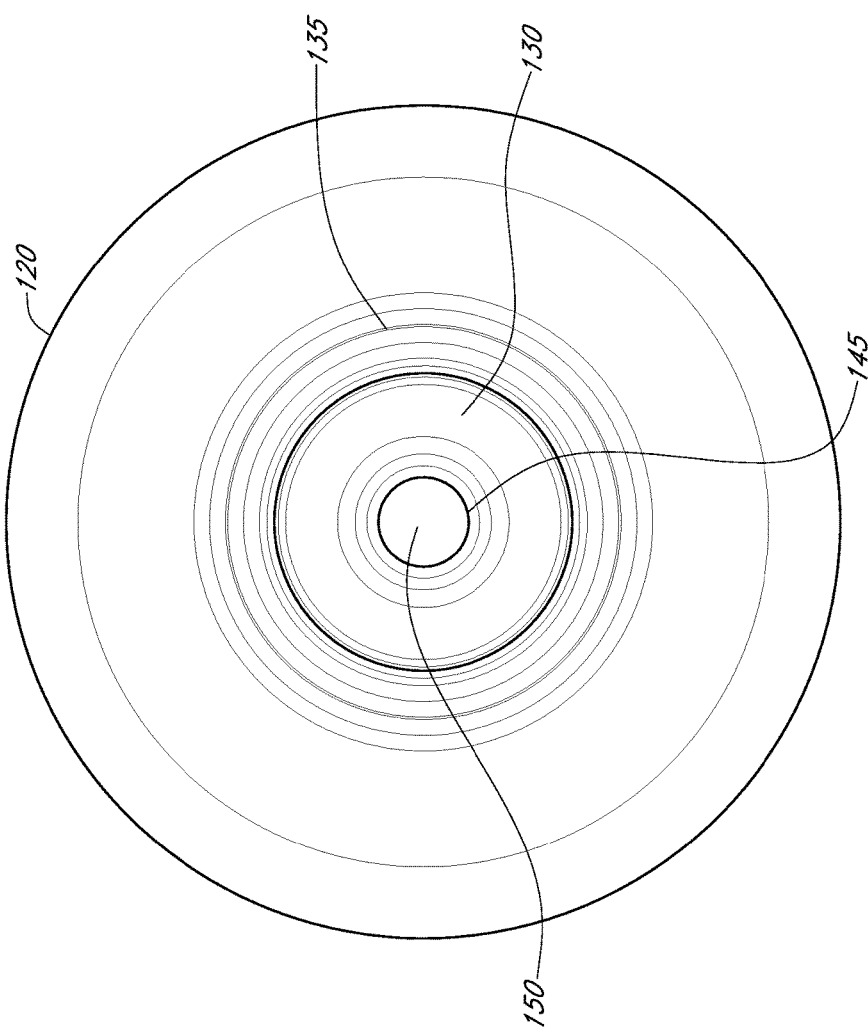
FIG. 6 is a bottom view of the gasket of FIG. 1.

FIG. 3 shows an enlarged perspective view of a portion of the gasket 100 showing the inner cavity 155. FIG. 4 shows a bottom perspective view of the gasket 100. FIG. 5 shows a top view of the gasket 100. FIG. 6 shows a bottom view of the gasket 100.

In some embodiments, one or more components of the gasket 100 can be formed of an elastic or compliant material. For example, one or more of the first body section 120, the second body section 125, the third body section 130, and the sealing ring 135 can be formed of an elastic or compliant material. In some embodiments, one or more first body section 120, the second body section 125, the third body section 130, and the sealing ring 135 can be integrally formed. In some embodiments, the gasket 100 or one or more of the first body section 120, the second body section 125, the third body section 130, and the sealing ring 135 can be formed of a thermoplastic material. In some embodiments, the gasket 100 or one or more of the first body section 120, the second body section 125, the third body section 130, and the sealing ring 135 can be an elastomer or formed of an elastomeric material. In some embodiments, the gasket 100 or one or more of the first body section 120, the second body section 125, the third body section 130, and the sealing ring 135, can be formed of one or more of the following materials: MD-225, MD-165, MD-34065, MD-50263, MD-50273, and MD-50283.

In some embodiments, the gasket 100 or one or more of the first body section 120, the second body section 125, the third body section 130, and the sealing ring 135, can be formed of a material having a shore hardness of 65, 73, 76, 83 or 85. In some embodiments, the one or more of the first body section 120, the second body section 125, the third body section 130, and the sealing ring 135, can be formed of a material having a break pressure of 4.8 MPa, 9 MPa, 11.9 MPa, 14.4 MPa, 16.3 MPa, or 17.9 MPa. In some embodiments, the gasket 100 or one or more of the first body section 120, the second body section 125, the third body section 130, and the sealing ring 135 can be injection molded.

Figure 7:
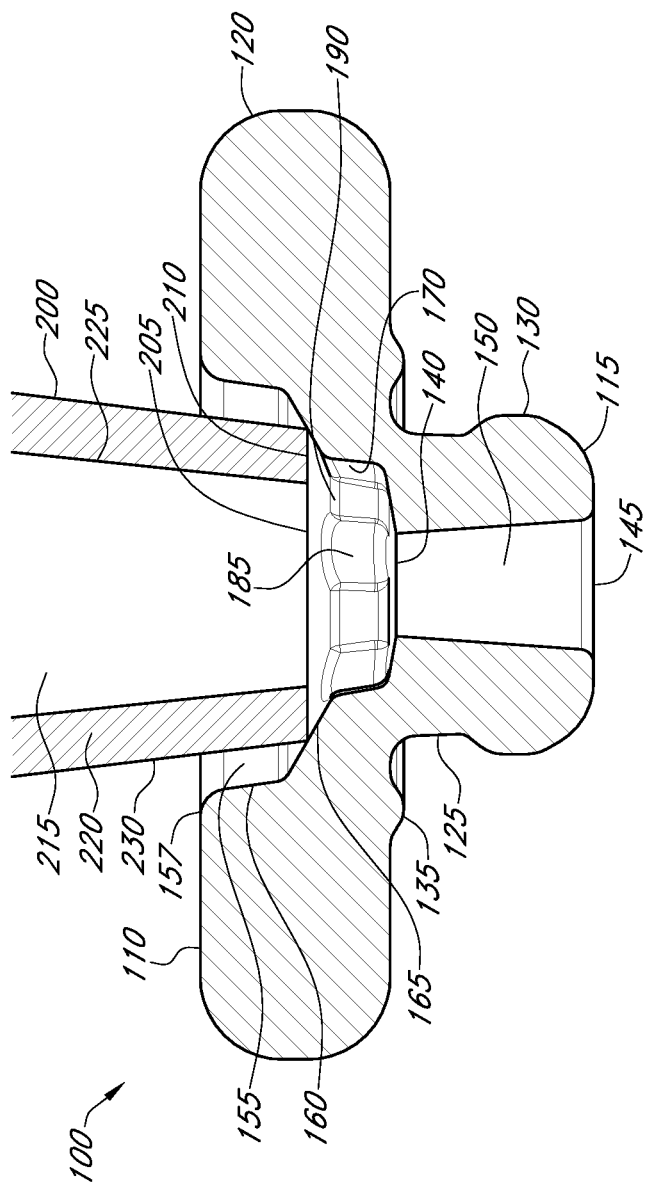
FIG. 7 is a cross-sectional view of the gasket of FIG. 1 in engagement with a pipette tip.

FIG. 7 shows a cross-sectional view of the gasket 100 receiving a non-limiting embodiment of a pipette tip 200. The pipette tip 200 can include an outlet port 205 at a distal end 210 of the pipette tip 200. Fluid flowing through a cannula 215 of the pipette tip 200 can exit the outlet port 205. A diameter of the cannula 215 can be defined by an inner surface 225 of a pipette tip wall 220. The pipette tip wall 220 can have an outer surface 230.

In some embodiments, the pipette tip 200 is a 5 ml pipette tip. In some embodiments the pipette tip 200 is a Gilson Diamond tip D5000.

In some embodiments, the taper or angle of the inner surface section 160 can direct the pipette tip 200 towards the center of the inner cavity 155 when the pipette tip 200 is introduced into the inner cavity 155. In some embodiments, the inner surface section 160 can direct the pipette tip 200 towards the center of the inner cavity 155 so that the outlet port 205 of the pipette tip 200 aligns with the inlet port 140 of the gasket 100.

In some embodiments, the gasket 100 can be dimensioned such that a separation distance between the inner surface section 160 and an outer surface 230 of the pipette tip 200 is 1 mm, less than 1 mm, 0.7 mm, 0.6 mm, 0.5 mm, 0.4 mm, 0.3 mm, less than 0.3 mm, 0.2 mm, 0.16 mm, between 0.16 mm and 0.3 mm, or 0.1 mm. In some embodiments, the gasket 100 can be dimensioned such that a separation distance between the inner surface section 160 and an outer surface 230 of the pipette tip 200 is of a sufficient distance to prevent formation of a friction fit between the gasket inner surface section 160 and the pipette tip 200. If a separation distance is too small, a friction fit may result. In certain instances, a separation distance that is too small may result in a quasi-seal between the inner surface section 160 and the pipette tip 200 due to the presence of liquid in a gap between the inner surface section 160 and the pipette tip 200. In certain instances, if a seal forms between inner surface section 160 and pipette tip 200 during insertion or removal of the tip 200 from the gasket 100, an undesirable volume of air or liquid can be injected or retrieved from the flowcell.

In some embodiments, the angle or taper of the inner surface section 160 can correspond to an angle or taper of the pipette tip 200. In some embodiments, the gasket 100 can be dimensioned to receive a range of diameters of a pipette tip 200, for example, to accommodate a manufacturing tolerance of the pipette tip 200.

In some embodiments, an outer diameter of the distal end 210 of the pipette tip 200 can extend beyond the diameter of the section of the inner cavity 205 defined by the inner surface section 170. As shown in FIG. 7, portions of the distal end 210 of the pipette tip 200 contact the inner surface section 165 of the gasket 100. In some embodiments, the angle or taper of the inner surface section 165 prevents formation of a friction fit between the gasket 100 and the pipette tip 200. For example, the angle or taper of the inner surface section 165 can allow for contact between the pipette tip 200 and gasket 100 over a smaller surface area than if the inner surface section 165 was parallel to the distal end 210 of the pipette tip 200.

In use, pressure can be applied to the pipette tip 200 to form a temporary seal with the gasket 100. In some embodiments, pressure can be applied to the pipette tip 200 to form a temporary seal with the inner surface section 165. In some embodiments, formation of a temporary seal between the tip 200 and the inner surface section 165 can be facilitated by a compliant material of the gasket 100.

Figure 8:
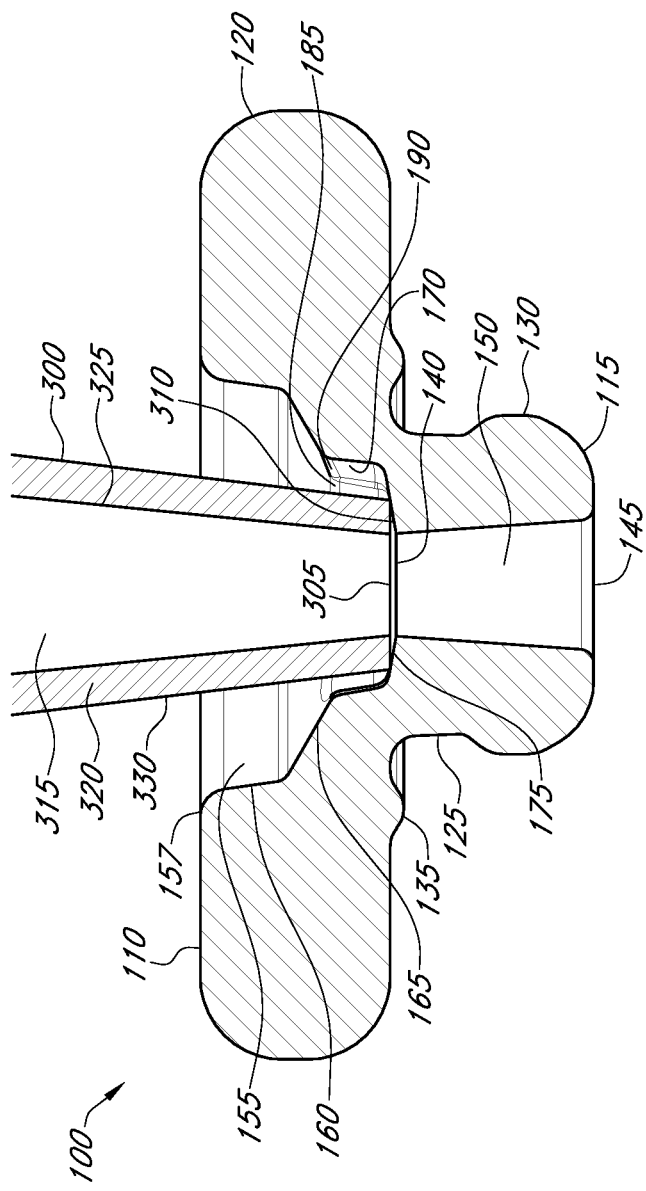
FIG. 8 is a cross-sectional view of the gasket of FIG. 1 in engagement with a pipette tip.

FIG. 8 shows a cross-sectional view of the gasket 100 receiving a non-limiting embodiment of a pipette tip 300. The pipette tip 300 can include an outlet port 305 at a distal end 310 of the pipette tip 300. Fluid flowing through a cannula 315 of the pipette tip 300 can exit the outlet port 305. A diameter of the cannula 315 can be defined by an inner surface 325 of a pipette tip wall 320. The pipette tip wall 320 can have an outer surface 330.

In some embodiments, the pipette tip 300 is a 1.2 ml pipette tip. In some embodiments the pipette tip 200 is a Gilson Diamond tip D1200.

In some embodiments, an outer diameter of the distal end 310 of the pipette tip 300 can be smaller than the diameter of the section of the inner cavity 225 defined by the inner surface section 170. In some embodiments, the taper or angle of the inner surface section 170 can direct the pipette tip 300 towards the center of the inner cavity 155 when the pipette tip 300 is introduced into the inner cavity 155. In some embodiments, the taper or angle of the inner surface portions 190 can direct the pipette tip 300 towards the center of the inner cavity 155 when the pipette tip 300 is introduced into the inner cavity 155. In some embodiments, the inner surface section 170 can direct the pipette tip 300 towards the center of the inner cavity 155 so that the outlet port 305 of the pipette tip 300 aligns with the inlet port 140 of the gasket 100. In some embodiments, the inner surface portions 190 can direct the pipette tip 300 towards the center of the inner cavity 155 so that the outlet port 305 of the pipette tip 300 aligns with the inlet port 140 of the gasket 100.

In some embodiments, the gasket 100 can be dimensioned such that a separation distance between the inner surface section 170 and an outer surface 330 of the pipette tip 300 is 1 mm, less than 1 mm, 0.7 mm, 0.6 mm, 0.5 mm, 0.4 mm, 0.3 mm, less than 0.3 mm, 0.233 mm, 0.2 mm, 0.16 mm, between 0.16 mm and 0.3 mm, 0.106 mm, or 0.1 mm. In some embodiments, the gasket 100 can be dimensioned such that a separation distance between the surface portions 190 and an outer surface 330 of the pipette tip 300 is 1 mm, less than 1 mm, 0.7 mm, 0.6 mm, 0.5 mm, 0.4 mm, 0.3 mm, less than 0.3 mm, 0.233 mm, 0.2 mm, 0.16 mm, between 0.16 mm and 0.3 mm, 0.106 mm, or 0.1 mm. In some embodiments, the gasket 100 can be dimensioned such that a separation distance between an inner surface of the vents 185 and an outer surface 330 of the pipette tip 300 is 1 mm, less than 1 mm, 0.7 mm, 0.6 mm, 0.5 mm, 0.4 mm, 0.3 mm, less than 0.3 mm, 0.233 mm, 0.2 mm, 0.16 mm, between 0.16 mm and 0.3 mm, 0.106 mm, or 0.1 mm. In some embodiments, the gasket 100 can be dimensioned such that a separation distance between the inner surface section 170 and an outer surface 330 of the pipette tip 300 is of a sufficient distance to prevent formation of a friction fit between the gasket inner surface section 170 and the pipette tip 200. In some embodiments, the gasket 100 can be dimensioned such that a separation distance between the surface portions 190 and an outer surface 330 of the pipette tip 300 is of a sufficient distance to prevent formation of a friction fit between the inner surface portions 190 and the pipette tip 200. In some embodiments, the gasket 100 can be dimensioned such that a separation distance between an inner surface of the vents 185 and an outer surface 330 of the pipette tip 300 is of a sufficient distance to prevent formation of a friction fit between the gasket inner surface section 170 and the pipette tip 200. If a separation distance is too small, a friction fit may result. In certain instances, a separation distance that is too small may result in a quasi-seal between the inner surface section 170 and the pipette tip 300 due to the presence of liquid in a gap between the inner surface section 170 and the pipette tip 300. In certain instances, a separation distance that is too small may result in a quasi-seal between the vents 185 and/or surface portions 190 and the pipette tip 300 due to the presence of liquid in a gap between t the vents 185 and/or surface portions 190 and the pipette tip 300. In certain instances, if a seal forms between inner surface section 170 and the pipette tip 300 during insertion or removal of the tip 300 from the gasket 100, an undesirable volume of air or liquid can be injected or retrieved from the flowcell. In certain instances, if a seal forms between the vents 185 and/or surface portions 190 and the pipette tip 300 during insertion or removal of the tip 300 from the gasket 100, an undesirable volume of air or liquid can be injected or retrieved from the flowcell. In some embodiments, the vents 185 can be dimensioned to prevent a friction fit or quasi-seal due to a small separation distance between the surface portions 190 and the pipette tip 300. In some embodiments, the vents 185 can have non-uniform geometry. In some embodiments, the vents 185 can have sharp edges. Non-uniform geometry and/or sharp edges of the vents 185 can reduce the effects of surface tension for any liquid residing in a gap between the inner surface section 170 and the pipette tip 300.

In some embodiments, the angle or taper of the inner surface section 170 can correspond to an angle or taper of the pipette tip 300. In some embodiments, the gasket 100 can be dimensioned to receive a range of diameters of a pipette tip 300, for example, to accommodate a manufacturing tolerance of the pipette tip 300.

As shown in FIG. 8, portions of the distal end 310 of the pipette tip 300 contacts the inner surface section 175 of the gasket 100. In some embodiments, the angle or taper of the inner surface section 175 prevents formation of a friction fit between the gasket 100 and the pipette tip 300. For example, the angle or taper of the inner surface section 175 can allow for contact between the pipette tip 300 and gasket 100 over a smaller surface area than if the inner surface section 175 was parallel to the distal end 310 of the pipette tip 300.

In use, pressure can be applied to the pipette tip 300 to form a temporary seal with the gasket 100. In some embodiments, pressure can be applied to the pipette tip 300 to form a temporary seal with the inner surface section 175. In some embodiments, formation of a temporary seal between the tip 300 and the inner surface section 175 can be facilitated by a compliant material of the gasket 100.

Figure 9:
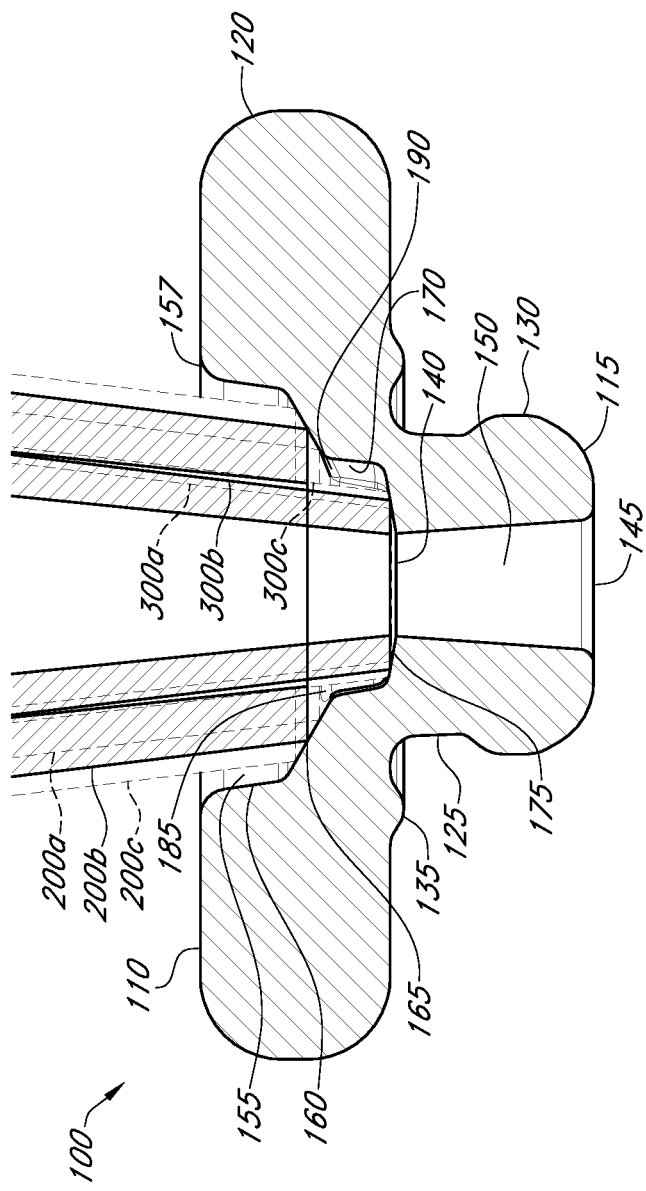
FIG. 9 is a cross-sectional view of the gasket of FIG. 1 illustrating a non-limiting range of sizes of pipette tips that can be received within the gasket.

FIG. 9 shows a cross-sectional view of the gasket 100 with examples of three different sizes of the pipette tip 200 and three different sizes of the pipette tip 300 shown therein. The three different sizes of the pipette tip 200 are shown as pipette tips 200a, 200b, 200c. Pipette tips 200a and 200c are shown in dashed lines. In some embodiments, pipette tips 200a and 200c are representative of manufacturing tolerances of pipette tip 200b. In some embodiments, an outer diameter of the pipette tip 200b can be between 100 μm to 200 μm greater than an outer diameter of the pipette tip 200a. In some embodiments, the outer diameter of the pipette tip 200b can be 100 μm, 110 μm, 120 μm, 130 μm, 140 μm, 150 μm, 160 μm, 170 μm, 180 μm, 190 μm, or 200 μm greater than an outer diameter of the pipette tip 200a. In some embodiments, an outer diameter of the pipette tip 200c can be between 100 μm to 200 μm greater than an outer diameter of the pipette tip 200b. In some embodiments, the outer diameter of the pipette tip 200c can be 100 μm, 110 μm, 120 μm, 130 μm, 140 μm, 150 μm, 160 μm, 170 μm, 180 μm, 190 μm, or 200 μm greater than the outer diameter of the pipette tip 200b. The three different sizes of the pipette tip 300 are shown as pipette tips 300a, 300b, and 300c. Pipette tips 300a and 300c are shown in dashed lines. In some embodiments, pipette tips 300a and 300c are representative of a manufacturing tolerances of the pipette tip 300b. In some embodiments, an outer diameter of the pipette tip 300b can be between 20 μm to 100 μm greater than an outer diameter of the pipette tip 300a. In some embodiments, the outer diameter of the pipette tip 300c can be 20 μm, 30 μm, 40 μm, 50 μm, 60 μm, 70 μm, 80 μm, 90 μm, or 100 μm greater than an outer diameter of the pipette tip 300a. In some embodiments, an outer diameter of the pipette tip 300c can be between 20 μm to 100 μm greater than an outer diameter of the pipette tip 300b. In some embodiments, the outer diameter of the pipette tip 300c can be 20 μm, 30 μm, 40 μm, 50 μm, 60 μm, 70 μm, 80 μm, 90 μm, or 100 μm greater than the outer diameter of the pipette tip 300b. The various sizes of pipette tips 200a, 200b, 200c, 300a, 300b, and 300c are shown together in FIG. 9 to illustrate a non-limiting example of a range of sizes of pipette tips that can be accommodated by the gasket 100 and not as a representation that each of the pipette tips 200a, 200b, 200c, 300a, 300b, and 300c are positioned within the gasket 100 simultaneously.

Figure 10:
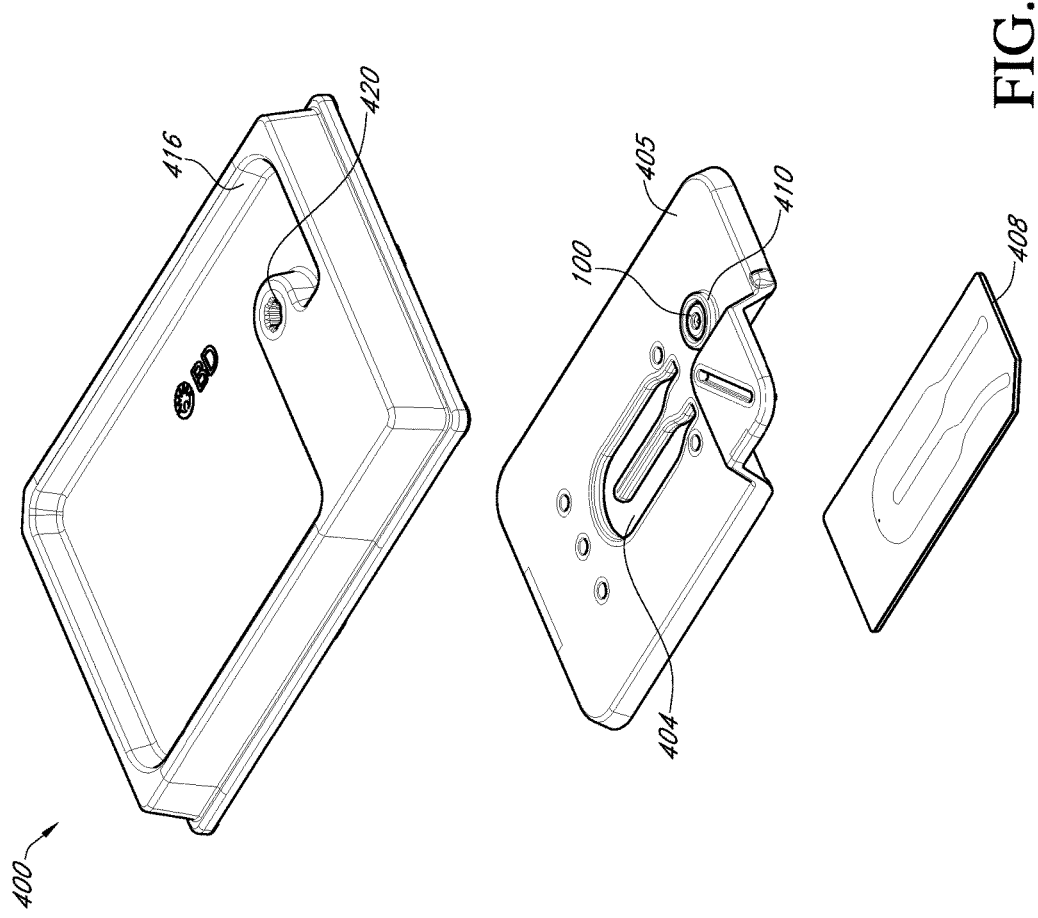
FIG. 10 is an exploded view of a portion of a cartridge having a flowcell housing the gasket of FIG. 1.

In some embodiments, the gasket 100 can interface with a flowcell. FIG. 10 depicts an exploded view of a non-limiting embodiment of a portion of a cartridge having a flowcell 400 interfacing with the gasket 100. As shown in FIG. 10, in some embodiments, the flowcell 400 can be part of a cartridge.

The flowcell 400 can include (i) one or more inlet ports for creating fluid connections with the instrument or manually introducing cell samples, bead suspensions, or other assay reagents into the cartridge. The flowcell can include one or more of (ii) one or more bypass channels, i.e. for self-metering of cell samples and bead suspensions, to avoid overfilling or back flow, (iii) one or more integrated microwell array/flowcell assemblies, or one or more chambers within which the microarray substrate(s) are positioned, (iv) integrated miniature pumps or other fluid actuation mechanisms for controlling fluid flow through the device, (v) integrated miniature valves (or other containment mechanisms) for compartmentalizing pre-loaded reagents (for example, bead suspensions) or controlling fluid flow through the device, (vi) one or more vents for providing an escape path for trapped gas, (vii) one or more sample and reagent waste reservoirs, (viii) one or more outlet ports for creating fluid connections with the instrument or providing a processed sample collection point. (ix) mechanical interface features for reproducibly positioning the removable, consumable cartridge with respect to the instrument system, and for providing access so that external magnets can be brought into close proximity with the microwell array, (x) integrated temperature control components or a thermal interface for providing good thermal contact with the instrument system, (xi) optical interface features, e.g. a transparent window, for use in optical interrogation of the microwell array, or any combination thereof.

In some embodiments, the flowcell 400 can include a fluidic layer 405. The fluidic layer 405 can include a gasket interface 410 configured to receive and secure the gasket 100 within the fluidic layer 405. In some embodiments, the gasket 100 can be press-fit within the gasket interface 410. In some embodiments, one or both of the gasket 100 and gasket interface 410 can be dimensioned so that the gasket 100 self-aligns with a center of the flow gasket interface 410 when the gasket 100 is received therein.

The flowcell 400 can include a fluidic channel 404 formed by the fluidic layer 405, a microwell array substrate 408, and an interface layer 416. In some embodiments, the flowcell 400 can include an outlet port (not shown). In some embodiments, the outlet port can be positioned on the fluidic layer 405. In some embodiments, the outlet port can be positioned on the interface layer 416.

In some embodiments, the interface layer 416 includes a gasket interface 420. In some embodiments, the gasket interface 420 can be configured to align with the gasket 100 when the interface layer 416 is coupled to the fluidic layer 410.

Figure 11:
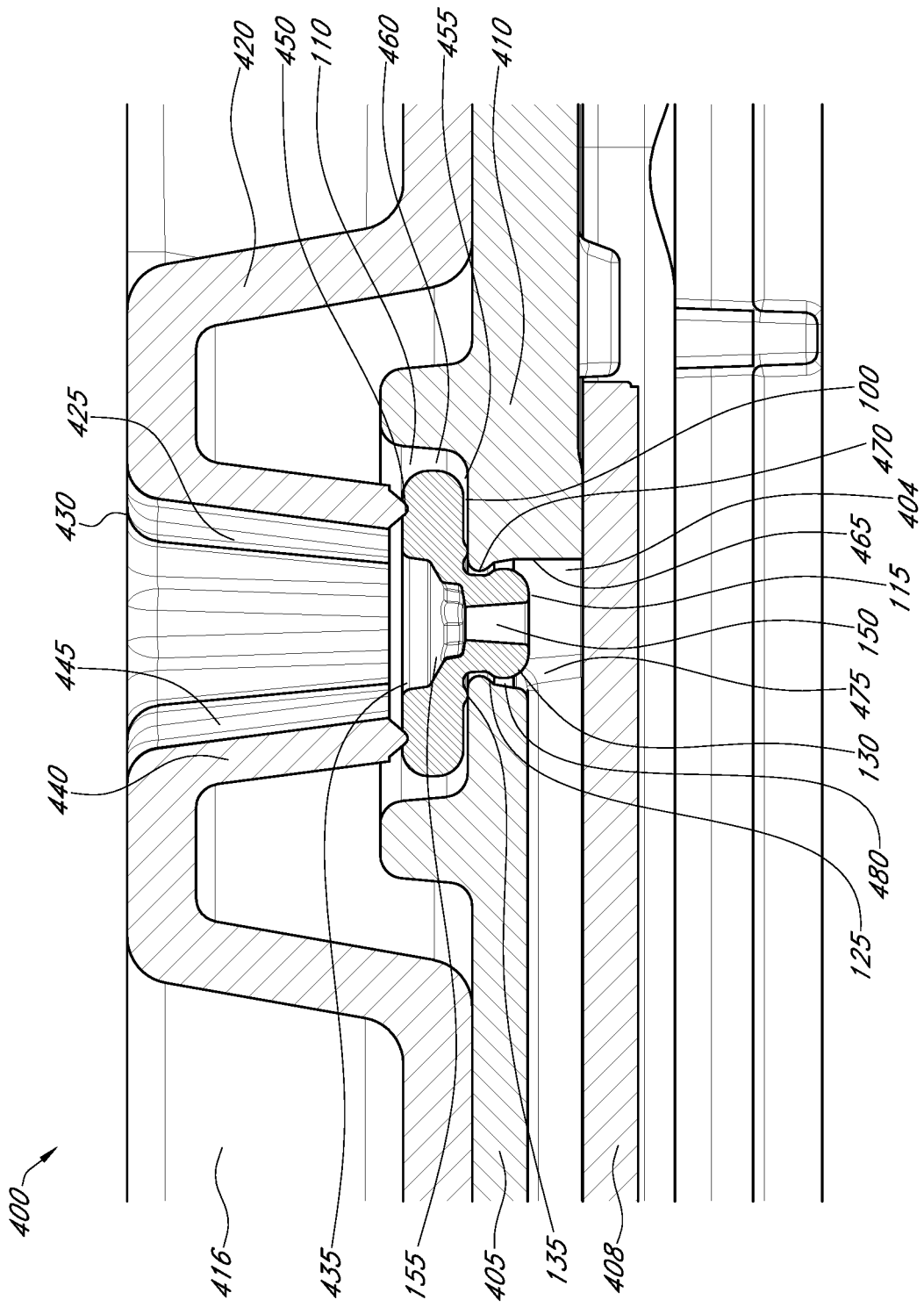
FIG. 11 is a cross-sectional view of a section of the flowcell of FIG. 10.

FIG. 11 shows a cross-sectional view of the gasket 100 positioned within the flowcell 400. As shown in FIG. 11 the gasket interface 410 of the fluidic layer can include a recess 460 having a bottom surface 455 at its distal end for receiving the body section 120 of the gasket 100. A lumen 465 can extend between a distal end of the recess 460 towards the fluid channel 404. The lumen 465 can have an inlet port 470 at a proximal end of the lumen 465 and an outlet port 475 at a distal end of the lumen 465. A diameter of the lumen inlet port 470 can be less than a diameter of the recess 460. The inlet port 470 can be formed in the bottom surface 455 of the recess 460.

In some embodiments, the inlet port 470 and lumen 465 can be dimensioned to receive at least a portion of one or more of the second body section 125 and the third body section 130. In some embodiments, the lumen 465 can flare or angle outwardly between a proximal portion and a distal portion of the lumen 465. In some embodiments, the lumen 465 can be defined at least partially by one or more surfaces 480 that angle or flare distally. In some embodiments, a diameter of the inlet port 465 can be less than the diameter of the third body section 130. In some embodiments, the flared or angled surfaces 480 can be dimensioned so that a distal portion of the lumen 465 has a diameter greater the diameter of the third section 130. In some embodiments, the gasket 100 can be introduced into the interface gasket interface 410 such that the third body section 130 is positioned within the lumen 465 distally beyond the inlet port 470. In such embodiments, the inlet port 470 can include have a diameter less than that of the third body section 130 to restrict or prevent removal of the gasket 100 from the fluidic layer 405.

As shown in FIG. 11, the sealing ring 135 can contact the bottom surface 455 of the recess 460 when the gasket 100 is secured within the gasket interface 410. In some embodiments, the sealing ring 135 can provide a seal at the interface of the gasket 100 and the fluidic layer 405. The sealing ring 135 can provide a seal between the gasket 100 and the bottom surface 455 of the recess 460. In some embodiments, the sealing ring 135 can provide a separation between the bottom surface 455 of the recess 460 and a distal edge of the first body section 120. In some embodiments, the sealing ring 135 can allow the gasket 100 to flex or bend distally, for example to compensate for an uneven surface at the proximal end 110 of the gasket 100.

With further reference to FIG. 11, the gasket interface 420 of the interface layer 416 can include a lumen 425 extending between an inlet port 430 and an outlet port 435. The diameter of the lumen 425 can be defined by an inner surface 445 of a wall 440. A distal end 450 of the wall 440 can define the outlet port 425.

The gasket interface 420 can be dimensioned so that the distal end 450 of the wall 440 can engage a portion of the first body section 110 of the gasket 100 laterally beyond the inner cavity 155. A force can be applied to the gasket interface 420 in an distal direction to cause the wall 440 to compress a portion of the first body section 110, resulting in a compression seal between the interface layer 416 and the gasket 100.

In some embodiments, the gasket interface 420 can be dimensioned so that the distal end 450 of the wall 440 can engage a portion of the first body section 110 of the gasket 100 laterally beyond the sealing ring 135. In such embodiments, pressure exerted on the first body section 110 by the wall 440 can cause the portions of the first body section 110 laterally beyond the sealing ring 135 to flex or bend distally about the sealing ring 135.

In some embodiments, the seal between the gasket 100 and the fluidic layer 405 and/or the seal between the gasket 400 and the interface layer 416 can be formed by compression of the compression of the gasket 100. In some embodiments, a force can be applied to the interface layer 416 to compress the gasket 100 between the interface layer 416 and the fluidic layer 405. In some embodiments, the interface layer 416 can be welded to the fluidic layer 405 to maintain compression of the gasket 100.

In some embodiments, the diameter of the lumen 425 can be greater than the diameter of the inner cavity 155. In some embodiments, the lumen 425 can be dimensioned to allow for the passage of a pipette tip, such as pipette tips 200 and 300 into the inner cavity 155. In some embodiments, fluid can be introduced into the inner chamber 155 from the pipette tip. Fluid introduced into the inner chamber 155 from the pipette tip can flow through the cannula 150. When the gasket 100 is positioned within the fluidic layer 405, fluid flowing through the cannula 150 can flow through the lumen 465 of the fluidic layer 405 and into the fluidic channel 404.

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. As used in this specification and the appended claims, the singular forms "a," "an," and "the" include plural references unless the context clearly dictates otherwise. Any reference to "or" herein is intended to encompass "and/or" unless otherwise stated.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc."

is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A gasket for providing a fluidic interface with a flowcell, the gasket comprising:
    a proximal end;
    a distal end configured to be received within the flowcell;
    a first body section extending distally from the proximal end and having a first body section outer diameter;
    an inner cavity extending distally from the proximal end through at least a portion of the first body section, the inner cavity being defined by a plurality of inner surface sections;
    a second body section positioned distal to the first body section and having a second body section outer diameter, wherein the second body section outer diameter is less than the first body section outer diameter;
    an inlet port positioned at a distal end of the inner cavity and at a proximal end of the second body section;
    a third body section positioned distal to the second body section and having a third body section outer diameter, wherein the third body section outer diameter is greater than the second body section outer diameter, and wherein the third body section outer diameter is less than the first body section outer diameter;
    an outlet port positioned at the distal end of the gasket; and
    a cannula extending between the inlet port and the outlet port and through at least a portion of the second body section and the third body section,
    wherein at least some of the plurality of inner surface sections are tapered towards the distal end of the gasket to direct a pipette tip received within the gasket towards the inlet port of the gasket.

2. The gasket of claim 1, wherein at least some of the plurality of inner surface sections are frustoconical in shape.

3. The gasket of claim 1, wherein the plurality of inner surface sections comprise a first set of inner surface sections configured to receive a pipette tip of a first size and a second set of inner surface sections configured to receive a pipette tip of a second size.

4. The gasket of claim 3, wherein a largest diameter of each inner surface section of the second set of inner surface sections is less than a smallest diameter of each inner surface section of the first set of inner surface sections.

5. The gasket of claim 4, wherein the inner surface sections of the second set of inner surface sections are positioned distally from the inner surface sections of the first set of inner surface sections.

6. The gasket of claim 1, wherein at least one of the plurality of inner surface sections comprises a plurality of vents.

7. The gasket of claim 6, wherein at least some of the plurality of vents are recessed from a plurality of intermittent surface portions extending between the plurality of vents.

8. The gasket of claim 1, further comprising a sealing ring extending distally from a distal end of the first body section.

9. The gasket of claim 1, wherein the gasket is formed of a thermoplastic material.

10. The gasket of claim 1, wherein the gasket is formed of an elastomeric material.

11. The gasket of claim 1, wherein the gasket is integrally formed.

12. A flowcell comprising:
    the gasket of claim 1;
    a fluidic layer having a first gasket interface; and
    an interface layer having a second gasket interface.

13. The flowcell of claim 12, wherein the gasket is compressed between the first gasket interface and the second gasket interface.

14. The flowcell of claim 12, wherein a distal section of the gasket is positioned within a lumen of the first gasket interface.

15. The flowcell of claim 14, wherein the lumen of the first gasket interface flares distally.

16. The flowcell of claim 14, wherein the lumen of the first gasket interface extends between an inlet port of the lumen of the first gasket interface and an outlet port of the lumen of the first gasket interface, wherein at least a portion of the distal section of the gasket positioned within the lumen of the first gasket interface has a diameter greater than a diameter of the inlet port.

17. The flowcell of claim 12, wherein the second gasket interface comprises a lumen for receiving a pipette tip, wherein the lumen is at least partially defined by an inner surface of a wall of the second gasket interface, wherein a distal edge of the wall of the second gasket interface is positioned to compress a proximal portion of the gasket.

18. The flowcell of claim 12, wherein the gasket comprises:
   a first body section; and
   a sealing ring extending distally from end of the first body section.

19. The flowcell of claim 18, wherein the second gasket interface comprises a recess having a bottom surface, wherein the bottom surface is positioned to engage the sealing ring.

20. The flowcell of claim 18, wherein the second gasket interface comprises a wall, wherein a distal edge of the wall of the second gasket interface is positioned to compress a proximal portion of the gasket such that the gasket bends about the sealing ring.

21. The flowcell of claim 12, wherein the first gasket interface, second gasket interface, and gasket form an inlet port of the flowcell.

22. The flowcell of claim 12, further comprising an outlet port.

23. The flowcell of claim 12, further comprising a microwell array.

24. A method for positioning the gasket of claim 1 within a flowcell, the method comprising:
   positioning the gasket within a first gasket interface of a fluidic layer of the flow cell;
   aligning a second gasket interface of an interface layer of the flowcell with the gasket so that the gasket is positioned between the first gasket interface and the second gasket interface; and
   applying a force to the first gasket interface in a direction of the gasket to form a seal between the gasket and the flowcell.

25. A method for loading a sample within a flowcell housing the gasket of claim 1, the method comprising:
   inserting a pipette tip into the inner cavity of the gasket;
   aligning the pipette tip with at least one of the plurality of inner surface sections; and applying a force on the pipette tip to form a releasable seal with the gasket.

26. The method of claim 25, further comprising introducing a fluid from the pipette into the inlet port of the gasket while maintaining the releasable seal.

27. The gasket of claim 7, wherein the plurality of inner surface sections comprises:
   a first inner surface section tapering at an angle of 50° from normal or less than 50° from normal;
   a second inner surface section positioned distal to the first inner surface section and tapering at an angle of 30° from normal or greater than 30° from normal;
   a third inner surface section positioned distal to the second inner surface section and comprising the plurality of vents and intermittent surface portions; and
   a fourth inner surface section positioned distal to the third inner surface section and tapering at an angle of between 65° to 90° from normal or greater than 75° from normal.

28. The gasket of claim 27, wherein one or both of the plurality of vents and the plurality of intermittent surface portions taper from the proximal end of the third inner surface section to the distal end of the third inner surface section.

* * * * *